United States Patent [19]
Hanna

[11] Patent Number: 5,368,423
[45] Date of Patent: Nov. 29, 1994

[54] ROBOTIC CUTTER
[75] Inventor: Robert N. Hanna, Houston, Tex.
[73] Assignee: Inliner U.S.A., Inc., Houston, Tex.
[21] Appl. No.: 191,424
[22] Filed: Feb. 3, 1994
[51] Int. Cl.[5] .......................... B23C 3/00; E03F 3/06
[52] U.S. Cl. .................................. 409/132; 166/55.7; 409/143
[58] Field of Search ............... 409/143, 132, 131; 166/55.7, 55.6, 55.2

[56] References Cited
U.S. PATENT DOCUMENTS

| | | | |
|---|---|---|---|
| 602,301 | 4/1898 | Bramlette. | |
| 2,178,554 | 11/1939 | Bowie | 255/1 |
| 2,198,821 | 4/1940 | Jessup | 255/1 |
| 2,326,827 | 8/1943 | Bynum | 255/1.4 |
| 2,327,023 | 8/1943 | Danner | 255/1.4 |
| 2,345,766 | 4/1944 | Miller | 255/1.6 |
| 2,354,399 | 7/1944 | Noble | 255/1.4 |
| 2,622,327 | 12/1952 | Halonen | 33/21 |
| 2,697,585 | 12/1954 | Chaney et al. | 255/1.4 |
| 2,971,259 | 2/1961 | Hahnau et al. | 33/1 |
| 3,175,392 | 3/1965 | Tharalson et al. | 73/84 |
| 3,464,313 | 9/1969 | Shay et al. | 90/12 |
| 3,587,194 | 6/1971 | Brown | 51/241 |
| 3,827,512 | 8/1974 | Edmond | 175/94 |
| 4,009,063 | 2/1977 | Wood | 156/71 |
| 4,064,211 | 12/1977 | Wood | 264/95 |
| 4,135,958 | 1/1979 | Wood | 156/199 |
| 4,197,908 | 4/1980 | Davis et al. | 166/55 |
| 4,442,891 | 4/1984 | Wood | 166/55.2 |
| 4,577,388 | 3/1986 | Wood | 29/558 |
| 4,630,676 | 12/1986 | Long, Jr. | 166/55 |
| 4,648,454 | 3/1987 | Yarnell | 166/297 |
| 4,701,988 | 10/1987 | Wood | 29/33 T |
| 4,714,119 | 12/1987 | Hebert et al. | 175/20 |
| 4,819,721 | 4/1989 | Long, Jr. | 166/55 |
| 4,986,314 | 1/1991 | Himmler | 166/55.7 X |

FOREIGN PATENT DOCUMENTS

| | | | |
|---|---|---|---|
| 97510 | 4/1984 | Japan | 409/143 |
| 3256303 | 10/1988 | Japan | 409/143 |
| 193116 | 8/1989 | Japan | 409/143 |
| 15909 | 1/1990 | Japan | 409/143 |
| 2232131 | 9/1990 | Japan | 409/143 |

Primary Examiner—William Briggs
Attorney, Agent, or Firm—Arnold White & Durkee

[57] ABSTRACT

An improved robotic cutter for re-establishing lateral connections in a lined sewer pipe is disclosed and claimed herein. The improved robotic cutter disclosed herein is a relatively small, lightweight cutter in which the cutting tool can be made to scribe a true circle, thus ensuring a true circular cutout of the lining blocking a lateral connection.

10 Claims, 8 Drawing Sheets

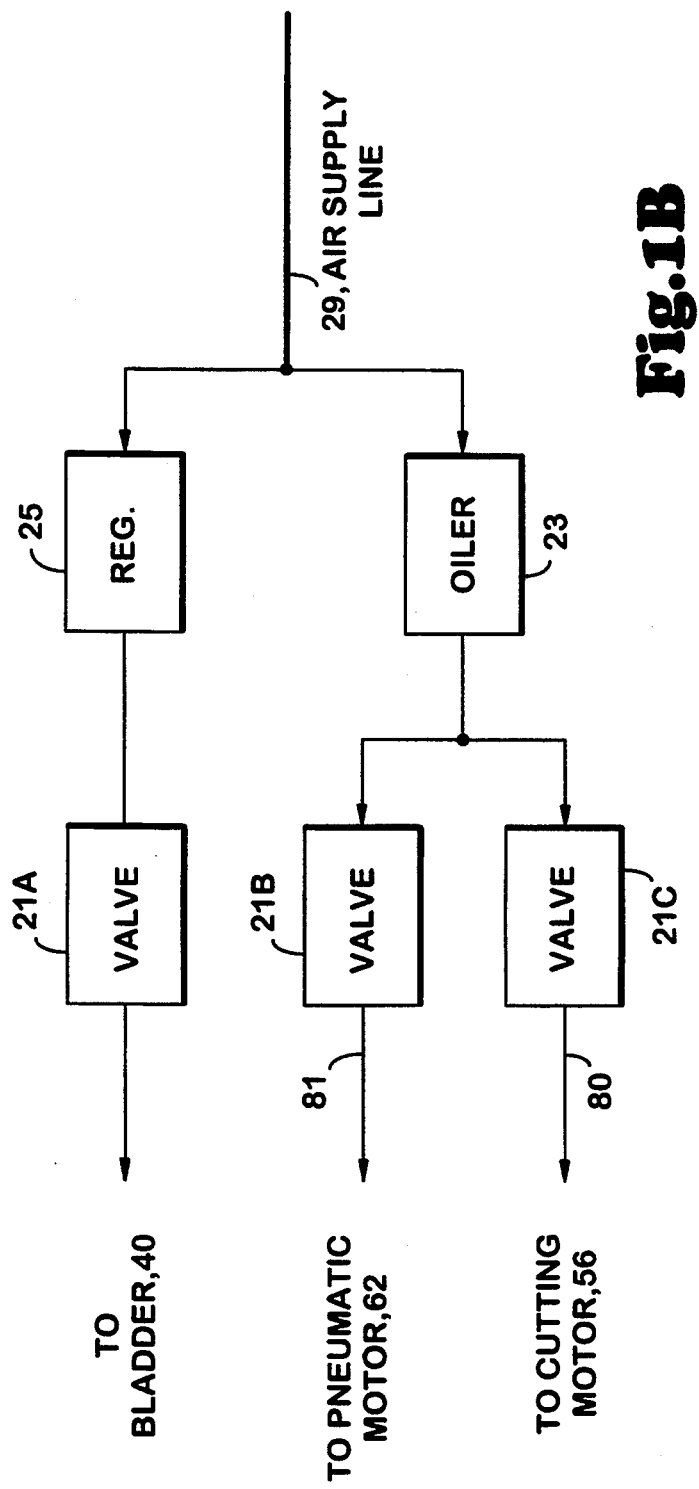

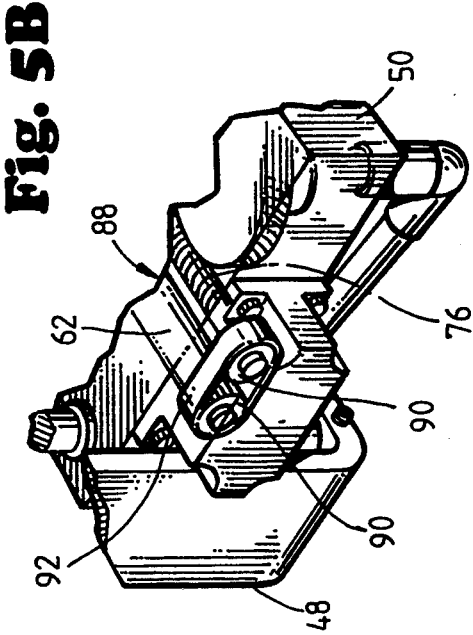
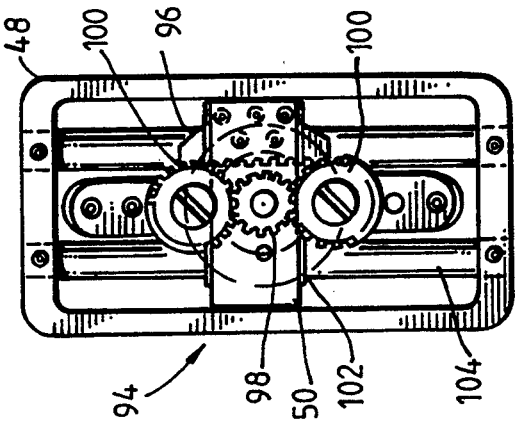
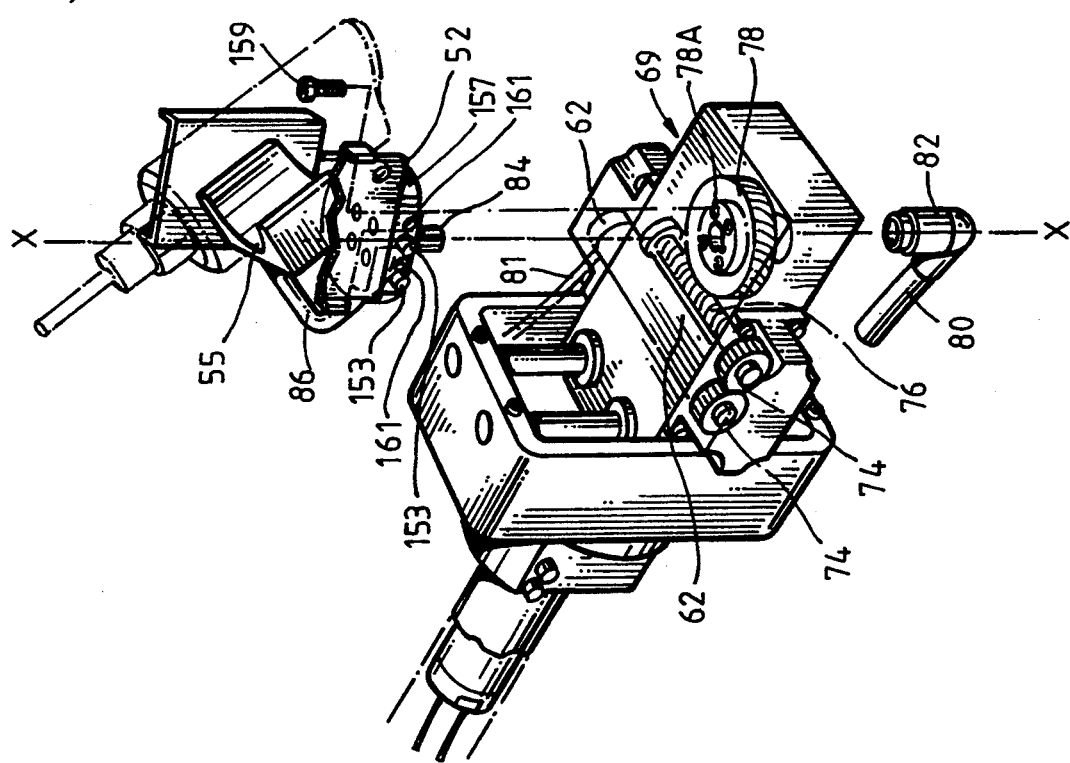

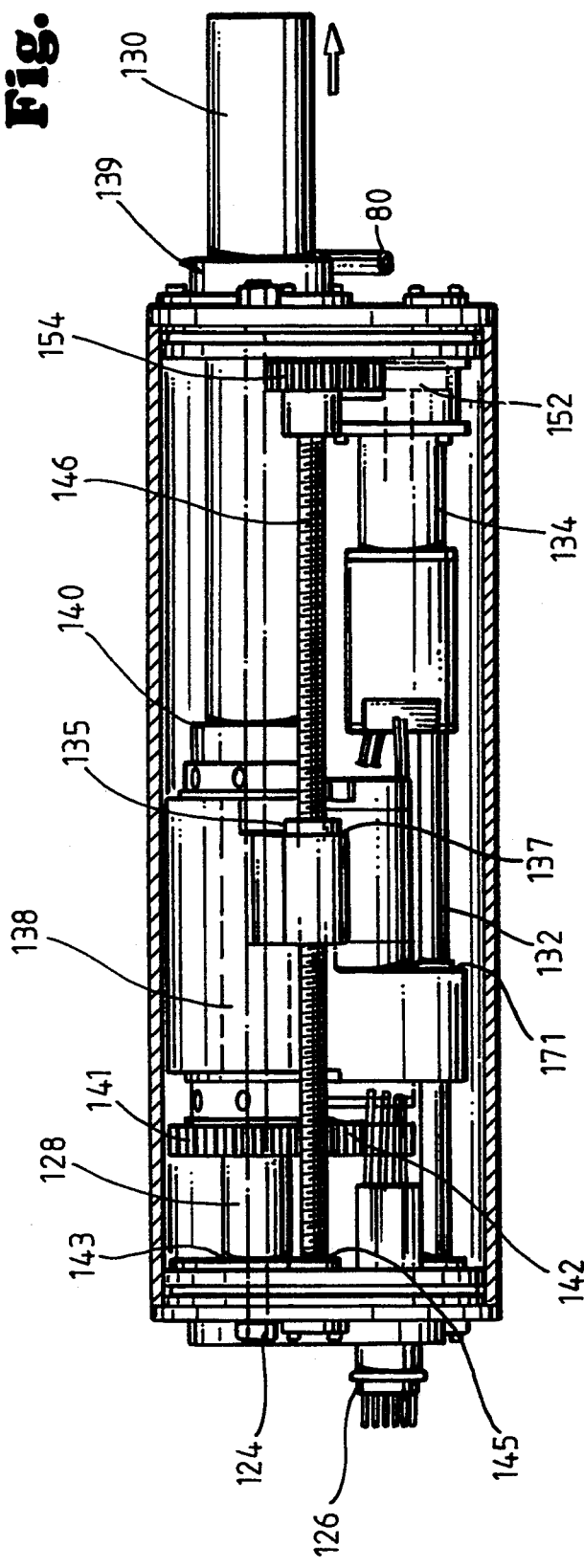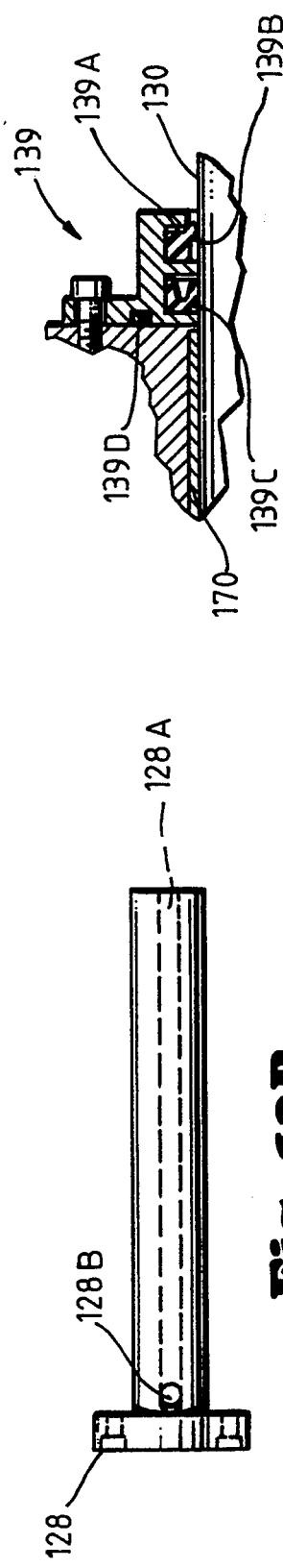

ROBOTIC CUTTER

BACKGROUND OF THE INVENTION

The present invention relates generally to a remotely controlled cutter apparatus for use within a conduit or pipe, and more particularly, to a remotely controlled cutter for use in re-establishing lateral connections in a previously lined sewer pipe or conduit.

It is generally well known that conduits or pipes which are employed for conducting fluids such as sanitary sewer pipes, storm sewer pipes, water lines, and gas lines, frequently require repair due to leakage. The leakage may be inwardly, from the environment into the pipe, or outwardly, from the pipe into the environment. The leakage may be due to improper formation or installation of the conduit or pipe, deterioration of the conduit or pipe due to ageing, attacks by acid or other corrosive materials, cracking due to earthquakes or vibrations caused by vehicular traffic, improper care, or a variety of other causes. Regardless of the cause, such leakage is undesirable because it may result in waste of the fluid being carried by the pipe, damage to the environment, and the possible creation of public health hazards.

Because of ever increasing labor and machinery cost, it is becoming increasingly more expensive to dig up and replace the leaking pipes or conduits. Additionally, it has become increasingly unacceptable and impractical to dig up the leaking pipes or conduits and physically replace them with new pipes due to the amount of space required by construction equipment and personnel, as well as the disruption to normal traffic patterns within a municipality.

As a result, various methods have been devised for the in situ repair or rehabilitation of existing pipes, thereby avoiding the expense, hazard, and inconvenience involved in digging up and replacing the leaking or damaged pipes. Some of these methods involve the insertion of an elongated flexible tubular liner comprised of felt or similar material that has been impregnated with a thermal setting synthetic resin into a deteriorated pipe. The liner is ultimately expanded and shaped to match the inner diameter of the pipe to be lined and the resin is allowed to cure to form a relatively hard, tight fitting, rigid pipe lining within the pipe. This liner effectively seals any cracks in the pipe and repairs any pipe or joint deterioration, thereby preventing further leakage either into or out of the pipe.

Another in situ repair technique involves the use of a folded polyethylene pipe in which a polyethylene pipe is generally folded into a U-shape cross-section and inserted into the damaged pipe. Thereafter, the U-shaped liner is expanded through use of temperature and pressure until it conforms with the shape of the inside surface of the original pipe wall.

Typically, the main conduit for a sanitary sewer system will have a plurality of connecting service entrances, or laterals, which carry sewage from individual sources into the main pipe. As is readily apparent, when the damaged pipe or conduit has been relined, all of the service entrances or laterals are effectively covered and sealed by the liner. Therefore, it is necessary to re-establish, or re-open, these lateral connections with the main sewer pipe. This can be accomplished by either digging up the earth adjacent the lateral connections and cutting holes in the liner corresponding to the lateral connection, or through use of a remotely controlled robotic cutter that is positioned within the lined main sewer pipe and may be operated so as to re-open or re-establish the openings from within the lined pipe.

Unlike prior art robotic cutters, the robotic cutter described herein enables a cutting tool to be rotated in a true circular arc about the longitudinal axis of the lateral pipe, thus ensuring that the opening for a lateral connection is a true circle. With prior art robotic cutters, the cutting tool cannot be rotated in a true circular path; rather, cutouts had to be made by manually controlling the longitudinal, vertical and/or rotational movement of the cutter head assembly. The prior art techniques require a very skilled cutter operator, are very time-consuming, and results in an inferior opening due to the erratic nature of the cut. Moreover, since the prior art robotic cutters cannot make a true circular cut, the openings made by such cutters is not uniform and frequently fail to fully open the lateral connection, thereby increasing the chances of subsequent blockage of the lateral openings.

SUMMARY OF THE INVENTION

The present invention provides an improved remotely controlled robotic cutter for re-establishing lateral connections in a re-lined pipe or conduit.

In a broad aspect, the invention disclosed herein comprises a system for generating a circular cut from within a main conduit to open a sealed lateral conduit connected to the main conduit. In a preferred embodiment, the robotic cutter has a cutting motor with a rotary cutting tool. In a preferred embodiment, the cutting tool rotates about its own axis as it is moved in a circular path or pattern which has the longitudinal axis of the lateral conduit as its approximate center. By adjusting the radius of rotation of the cutting tool, the cutting tool can be made to cut along the inner periphery of the cylindrical lateral conduit.

Due to the geometry of the junction of the intersecting lateral connection and the main conduit, the cutting tool will typically engage diametrically opposed points on the periphery of the junction between the lateral conduit and the main conduit. Accordingly, it is desirable that the rotating cutting tool be able to advance in a step-wise manner toward and along the axis of the lateral conduit during cutting operations. Step-wise advancement is also necessary as the cutting tool advances through a portion of the liner material with each circular rotation.

A turntable, or other suitable support member, is provided to support the cutting motor as it is rotated around a line generally parallel to the axis of the lateral conduit. Moreover, in a preferred embodiment, the cutting motor and tool can also be moved within the main conduit in a direction generally parallel to the longitudinal axis of the main conduit, and may be rotated about such a longitudinal axis.

In a broad aspect, a preferred embodiment of the invention comprises a cutting assembly which is movable along and within the main conduit. More particularly, the apparatus comprises a body member having a longitudinal axis, a rotatable main shaft, one end of which is supported by and extends from the body member, and a turntable supported at the other end of the shaft so as to be rotatable with the shaft. Motors or other suitable power devices are housed within the body member and connected to the shaft so as to (1) extend and retract the shaft and the turntable relative to the body member, and (2) rotate the main shaft, and thus the turntable, generally about the axis of the main shaft or about an axis generally parallel to the longitudinal axis of the main conduit. The main shaft and the turntable are preferably coupled together by a transverse travel block which enables the turntable, and thus the cutting motor and tool, to move transversely relative to the axis of the main shaft and the main conduit, This transverse movement enables the cutting tool to be advanced toward the lateral conduit.

As set forth previously, the cutting tool affixed to the cutting motor is offset from the axis of rotation of the motor's rotatable support member so that the cutting tool travels in a circular track of rotation. To that end, the position of the cutting motor and tool is transversely adjustable relative to the axis of the rotatable support member.

Since it is preferred that the apparatus of the invention be remotely operable, it is preferred that motors or other suitable drive members be provided to effect the several desired motions. Thus, separate drive motors may be placed in the body member to drive the main shaft rotationally and longitudinally. Similarly, a drive motor may be provided in the main shaft to effect the transverse movement of the transverse travel block. Likewise, a drive motor may also be provided in the turntable to effect the rotational movement of the cutting motor, and thus the cutting tool. The cutting motor may be used to drive the cutting tool.

The several drive members may be remotely powered and controlled by suitable cabling extending through the main conduit and attachable to a control panel positioned above ground. Similarly, the apparatus may be secured in position within the main conduit by an expandable bag element, wall clamp, shoes or the like.

These and other aspects of the present invention will be readily apparent to those skilled in the art from a review of the figures and the description of the preferred embodiment of the improved robotic cutter disclosed and claimed herein.

BRIEF DESCRIPTION OF THE DRAWINGS

The foregoing summary, as well as the following detailed description, will be better understood when read in conjunction with the appended drawings. For the purpose of illustrating the invention, a preferred embodiment of the present invention is shown in the drawings, it being understood that this invention is not to be considered limited to the precise arrangements and details shown therein. In the drawings:

FIG. 1B is a schematic drawing of the valving arrangement used to control and regulate the air supply to the cutter apparatus;

FIG. 5A is an exploded perspective view of the cutter head assembly;

FIG. 5B is a perspective view of an alternative belt drive configuration for rotation of the cutting motor;

FIG. 6 is a front elevation view of the vertical travel block used on the robotic cutter apparatus;

FIG. 13 is a side elevation view of the internal components of the robotic cutter.

FIG. 13A is a cross section view of the forward seal of the robotic cutter.

FIG. 13B is a perspective view of a rear support member used in the robotic cutter.

DETAILED DESCRIPTION OF THE PREFERRED EMBODIMENTS

Figure 1A:
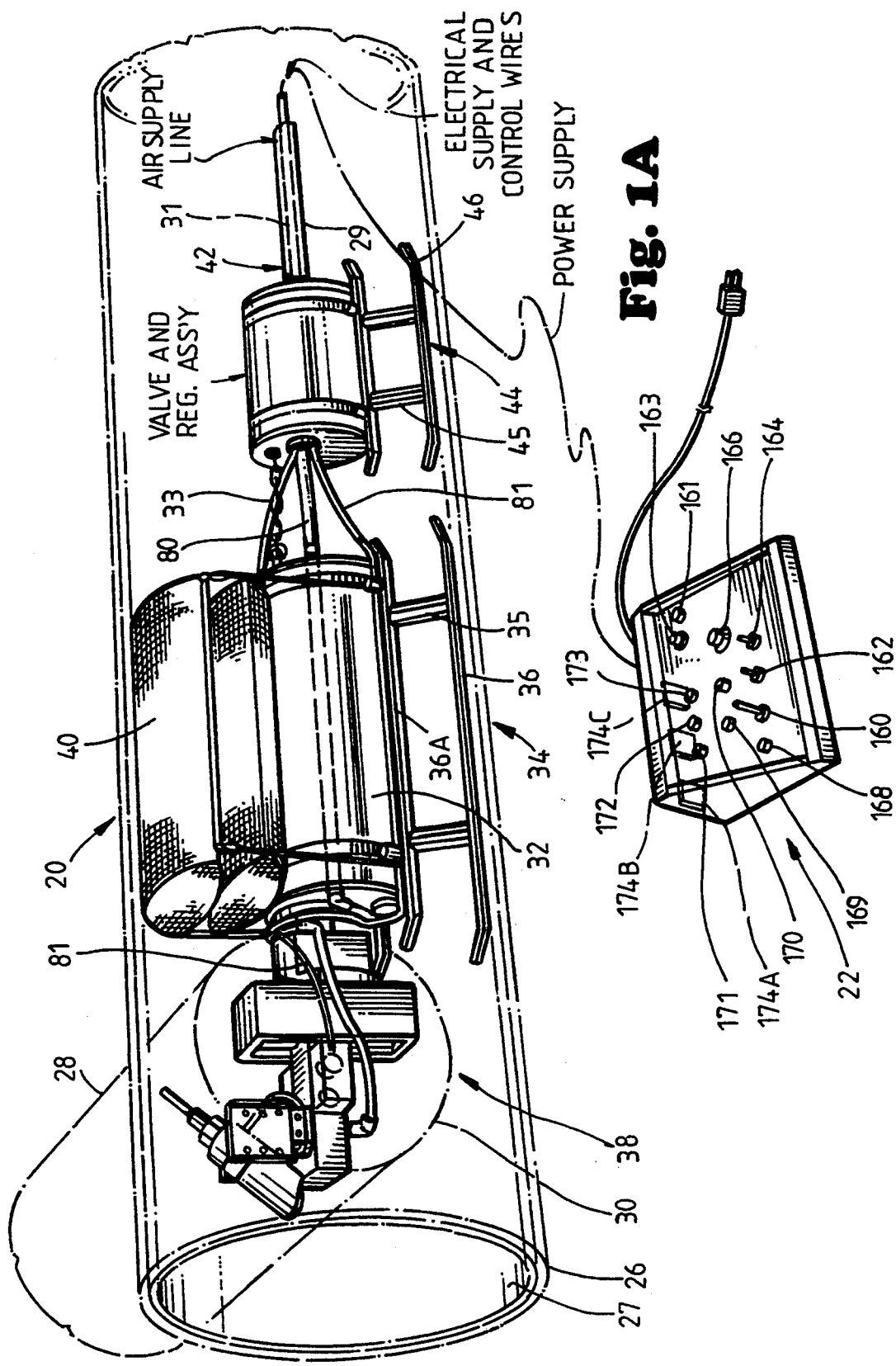
FIG. 1A is a perspective side view of a preferred embodiment of the cutter apparatus of the present invention that is shown disposed within a subterranean sewer pipe, as well as a control panel for controlling the cutter apparatus.
Figure 2:
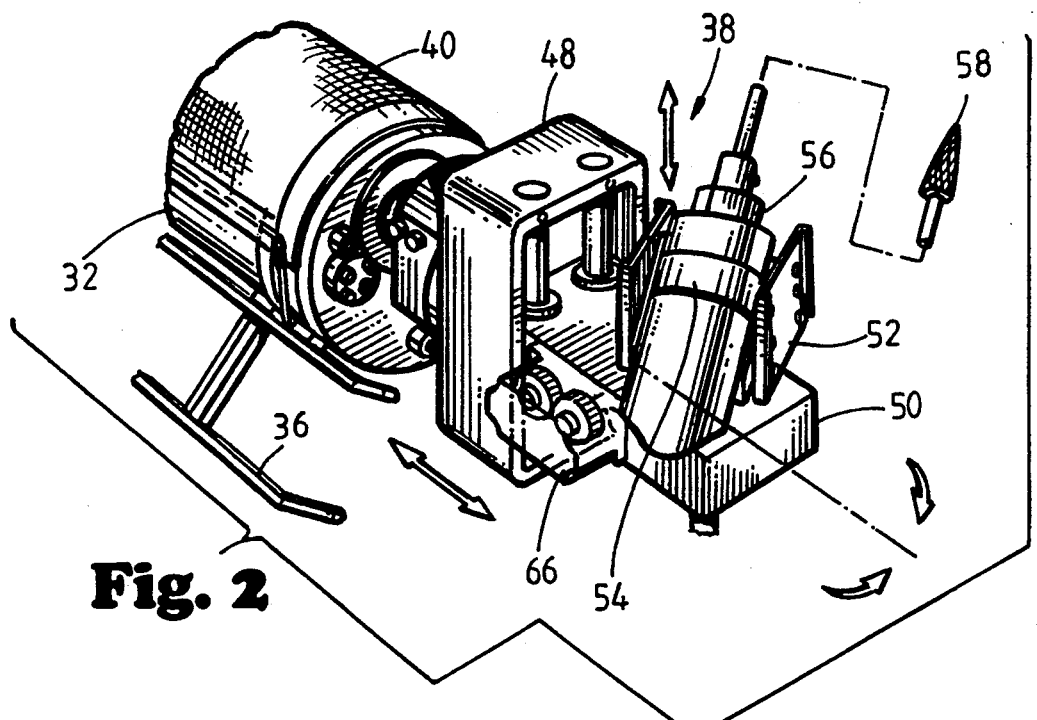
FIG. 2 is a perspective view of the front of the cutter apparatus.

FIG. 1A shows the overall configuration of a preferred embodiment of the robotic cutter 20 disposed in sewer pipe 26 that has previously been lined with liner 27. Also shown is lateral connection 28 which is connected to sewer pipe 26 via opening 30. The cutter 20 is generally comprised of cutter body 32, cutter head assembly 38, cutter carriage 34, anchor bladder 40, and valve assembly 42. The cutter carriage assembly 34 is comprised of bottom rails 36, upper rails 36A, and extensions 35. Similarly, there is a carriage 44 for the valve assembly 42 comprised of rails 46 and extensions 45. The control panel 22 allows an operator to remotely control the various functions capable of being performed by the robotic cutter 20. Although it is not shown in the drawings, the robotic cutter disclosed and claimed herein is used in conjunction with a television camera that is positioned so as to allow remote viewing of cutting operations. Such television cameras are routinely available and the present invention may be used with any of such cameras.

FIG. 1B schematically shows the valving arrangement used to control and regulate the air supply from the main air supply line 29 to the robotic cutter 20. The valving arrangement is contained in valve assembly housing 42. In particular, the valving arrangement is comprised of plurality of control valves 21A, 21B, and 21C, oiler 23, and regulator 25. Air to anchor bladder 40 is provided from air supply line 29 through regulator 25, control valve 21A then to bladder 40. Air is supplied to pneumatic motor 62 from air supply line 29, through oiler 23, control valve 21B, and through pneumatic motor air supply line 81. Similarly, air is supplied to cutting motor 56 from air supply line 29, through oiler 23, control valve 21C, and through cutting motor air supply line 80. Note that conduit 31 for electrical supply and control wires extends through main air supply line 29 and valve assembly housing 42 into the cutter body 32. A chain 33 is fixed to both the cutter body 32 and valve assembly housing 42 to prevent any stress on the pneumatic and electrical lines extending between cutter body 32 and valve assembly housing 42.

Referring now to FIGS. 2, 3, 4 and 5A, the cutter head assembly 38 is more specifically shown. Generally speaking, the cutter head assembly 38 is comprised of vertical travel block 48, turntable 50, motor 56 and hub 60. The turntable 50 is disposed for vertical travel within vertical travel block 48. Motor 56 is secured to motor height and angle adjustment bracket 52 by use of clamp 54 and motor mounting block 55 (shown in FIG. 5A). The motor height and angle adjustment brackets 52 are secured to base mounting block 157 through use of a plurality of screws 153. The base mounting block 157 is secured to worm wheel gear 78 with a plurality of base mounting block screws. Note that the motor height and adjustment brackets 52 have a plurality of holes 161 such that the brackets 52 may be shifted a certain distance laterally relative to the axis X—X as shown in FIG. 5A when the brackets 52 are secured to base mounting block 157. Motor 56 has cutting tool 58 attached thereto for use in cutting the liner of a lined sewer pipe to re-establish the lateral connections. Of course, cutting tool 58 may be of any desired shape or configuration that an operator deems practicable for the particular cutting operation at hand.

As shown in FIG. 5A, the present invention allows the motor 56 to be rotated 360° about a vertical axis shown as X—X in FIG. 5A. This rotation is accomplished by worm gear drive assembly 69 which is comprised of pneumatic motor 62, gears 74, worm gear 76 and worm wheel gear 78. Pneumatic motor air supply line 81 is used to supply air to pneumatic motor 62. In a particularly preferred embodiment, the pneumatic motor 62 is a 1/100 hp motor manufactured by Micro-Motors, Inc., Model No. MMR 0014; the worm gear 76 and worm wheel gear 78 is a worm and wheel gearbox, Model No. P30; manufactured by Hinchcliffe Precision Components. The specific gear ratio for the worm gear drive is approximately 10:1. An alternative design for the worm gear drive assembly 69 employing a belt drive is shown in FIG. 5B. In particular, FIG. 5B discloses the use of belt gears 90 and belt 92 for driving worm gear shaft 76 and worm wheel gear 78. Either embodiment of the worm gear drive assembly may be used on the invention disclosed herein.

The pneumatic motor 62 as well as gears 74 are protected by protective housings 64 and 66. The cutter head assembly 38 is secured to the main shaft 130 of the robotic cutter by hub 60. Hub 60, which is manufactured in one piece with vertical travel block 48 in a preferred embodiment, has a recess adapted to receive shaft 130 and the hub 60 is split such that screws 68 when tightened securely clamp hub 60 to shaft 130.

Air is supplied to cutting motor 56 through cutting motor air supply line 80. Cutting motor air supply line 80 is connected to turntable 50 through use of rotary swivel 82. In turn, air flows through hollow shaft 84, and air feed line 86 into motor 56.

The motor height and angle adjustment bracket 52, motor mounting block 55, and clamp 54 allow variable positioning of the motor 56, and thus cutting tool 58, at an angle relative to the axis X—X shown in FIG. 5A. The positioning of the motor 56, and cutting tool 58, is accomplished by varying the position of motor mounting block 55 in bracket 52. The motor mounting block 55 is secured at different heights and angles through use of a plurality of screws 57 and positioning holes 59 in bracket 52. This angled positioning of the motor enables the cutting tool 58 to be rotated in a true circular path at various radii about the axis X—X, thereby insuring a true circular cut of the pipe liner at a lateral connection.

Figure 3:
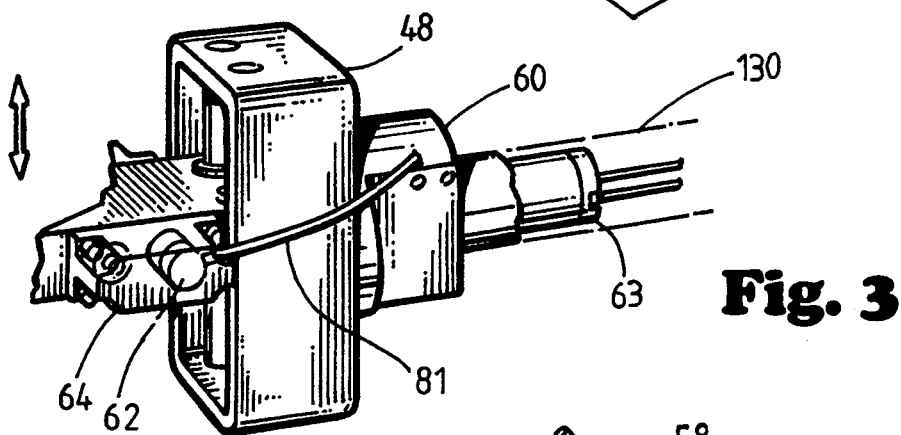
FIG. 3 is a perspective side view of a portion of the cutter head assembly.
Figure 4:
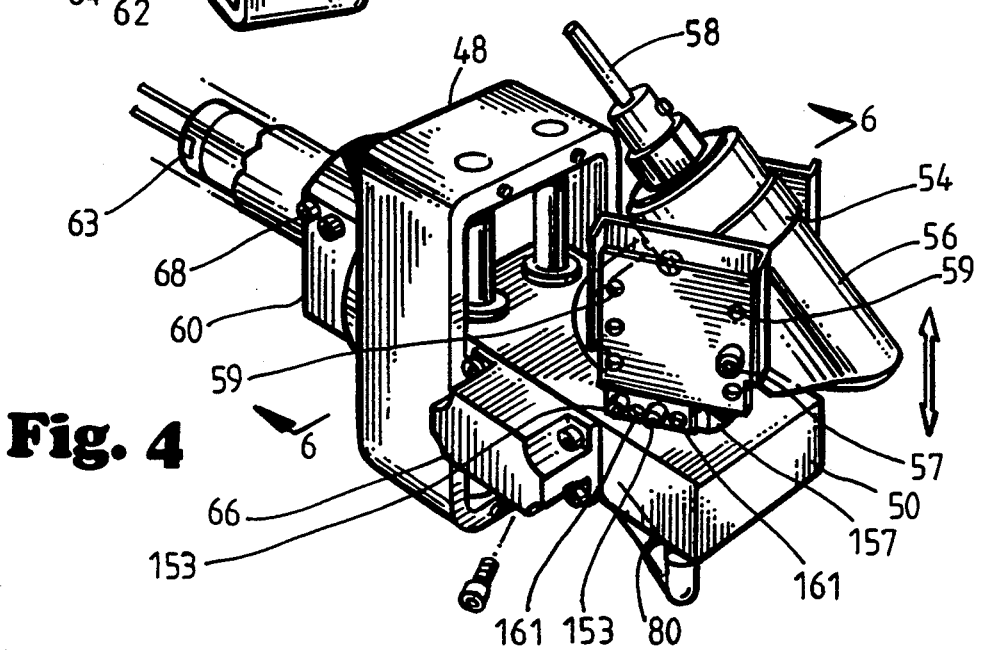
FIG. 4 is a perspective view of the cutter head assembly.
Figure 7A:
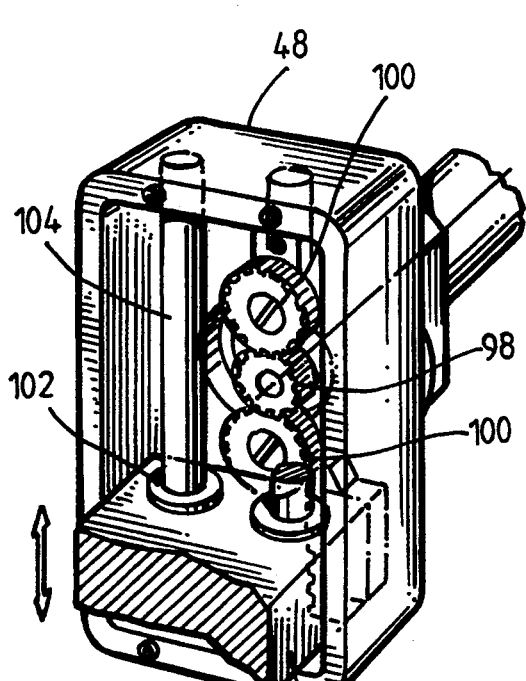
FIG. 7A is a front perspective view of the vertical travel block used on the robotic cutter apparatus.
Figure 7B:
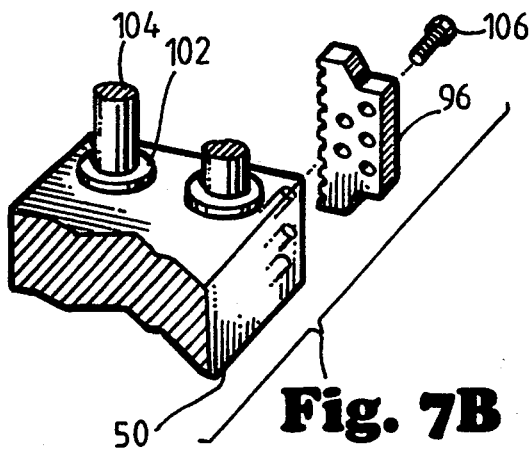
FIG. 7B is an exploded perspective view of the rack employed in the vertical travel block.
Figure 8B:
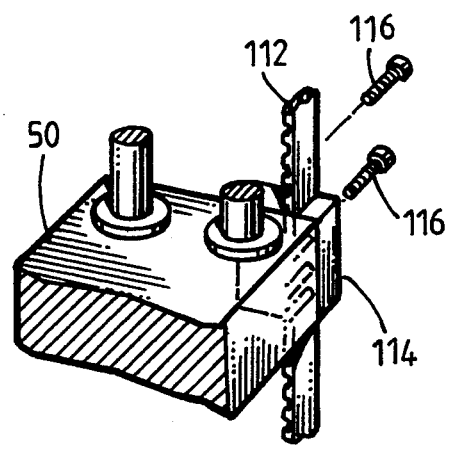
FIG. 8B is a perspective drawing of the alternative belt drive system for the vertical travel block.
Figure 8A:
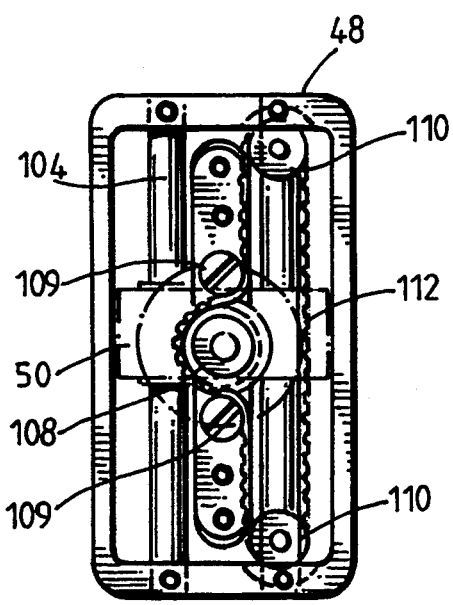
FIG. 8A is a front elevation view of an alternative embodiment of the vertical travel block employing a belt drive.
Figure 8C:
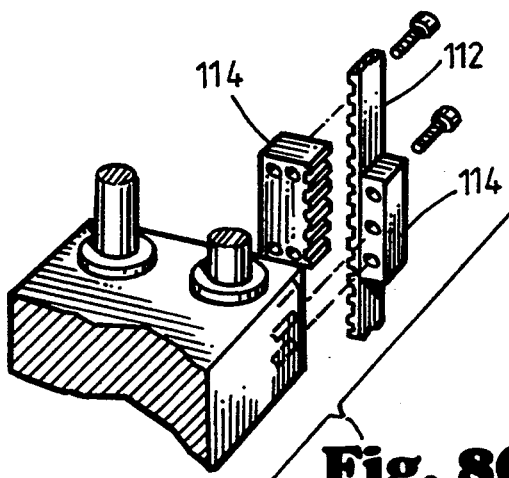
FIG. 8C is an exploded perspective view of the alternative beet drive system for the vertical travel block.

The vertical drive assembly 94 is more fully shown in FIGS. 3 and 6. Generally speaking, the vertical drive assembly 94 is comprised of vertical drive motor 63, rack 96, pinion gear 98, driven gears 100, linear bearings 102, bearing shafts 104, turntable 50, and vertical travel block 48. The pinion gear 98 is attached to vertical travel motor 63 and is engaged with both driven gears 100. The driven gears 100 are attached to vertical travel block 48. The rack 96 is secured to the turntable 50 through use of a plurality of screws 106. The turntable 50 is free to travel vertically through use of linear bearings 102 which slide on bearing shafts 104. In FIG. 7A, the turntable 50 is shown in its lower-most position. Note that only one of the driven gears 100 is in contact with rack 96 when the turntable 50 is at either extended position. An alternative embodiment for the vertical drive assembly 94 is shown in FIGS. 8A, 8B and 8C. This alternative embodiment employs a belt drive as opposed to the pure gear drive described above. The alternative belt drive embodiment is comprised of drive gear 108, tension rollers 109, idler rollers 110, belt 112, and in the particular configuration shown in the drawings, requires a two-piece belt clamp 114 which is attached to turntable 50 through use of screws 116.

Figure 9A:
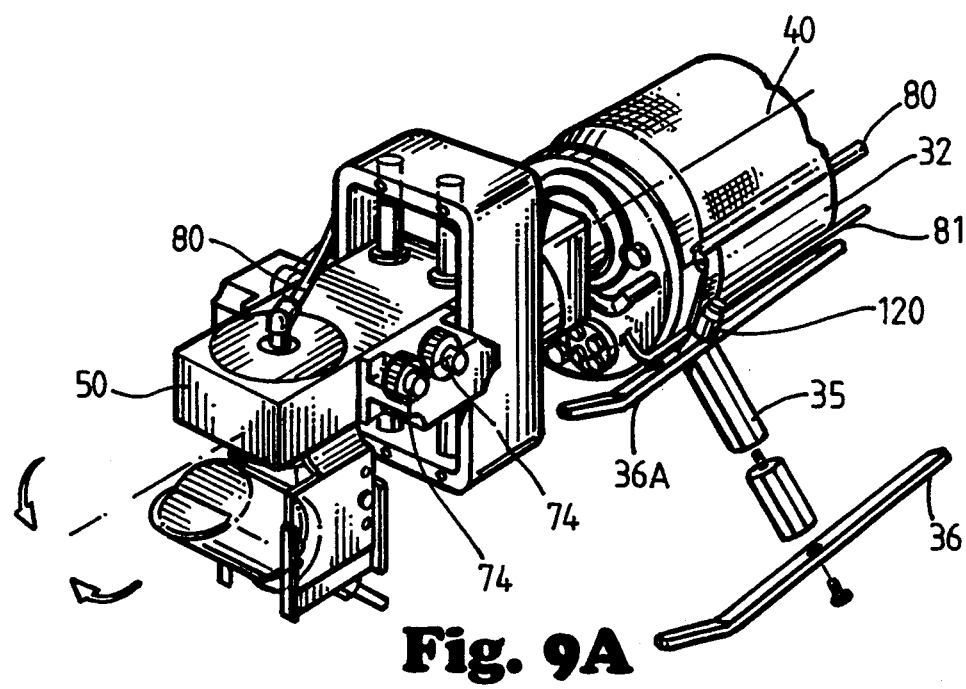
FIG. 9A is a front perspective view showing the robotic cutter with the cutter head assembly in an upside-down position.
Figure 9B:
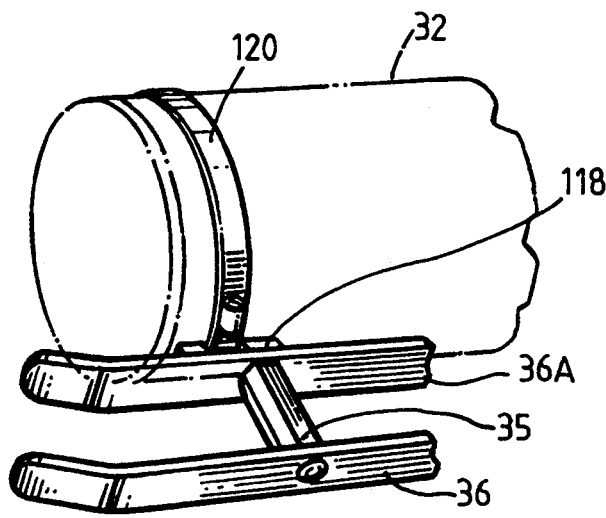
FIG. 9B is a perspective view of the carriage and rail system used to support the robotic cutter within a sewer pipe.

FIG. 9A shows the robotic cutter 20 with the cutter head assembly 38 in an inverted or downward position. FIG. 9B shows how carriage assembly 34 is secured to cutter body 32 through use of clamp 120 passing through slotted bracket 118 attached to upper rail 36A.

Figure 10:
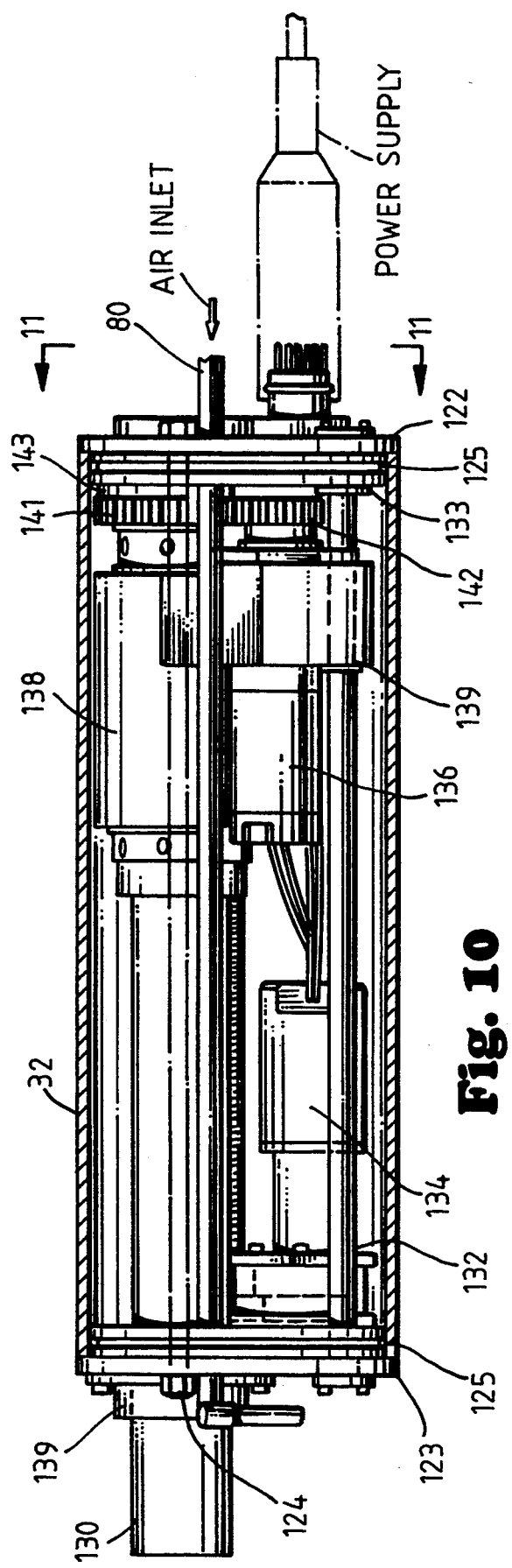
FIG. 10 is a side elevation view of the internal components of the robotic cutter.

The internal components of the robotic cutter 20 are best shown in FIGS. 10, 11, 12 and 13, 13A and 13B. Referring to FIG. 10, front plate 123 and rear plate 122 are secured to cutter body 32 through use of a plurality of tie rods 124. O-rings 125 are disposed between the front and rear plates and the cutter body. Main shaft 130 extends into cutter body 32 through forward seal 139 and passes through linear bearing 170 and bearing assembly 140. Main shaft gear 141 is attached on one end of the main shaft 130. Bearing assembly 140 is disposed within motor cradle 138. Rotational motor 136 is also disposed within motor cradle 138 and has rotational motor gear 142 attached thereto for engagement with main shaft gear 141 attached to main shaft 130. A guide rod 132 also extends through the length of the cutter body assembly and through slide bearing opening 171 in motor cradle 138. Also shown in FIG. 10 is the air supply line 80 which is used to supply air to cutting motor 56. Forward seal 139, which is shown in more detail in FIG. 13A, is comprised of housing 139A, seals 139B, 139C, and O-ring 139D. Forward seal housing 139A is secured to cutter body 132 by bolting. In a preferred embodiment, the seals are Model. No. 8600 and 8400 manufactured by Parker and made from Nitroxile, a low friction material.

In a preferred embodiment, rotational motor 136 is a 1/150 hp motor manufactured by Globe Motors, Type No. CLL; bearing assembly 140 and 170 are teflon coated bearings manufactured by Pacific Bearings, and sold under the trademark Simplicity; main shaft gear 141 is a 50 tooth stainless steel spur gear manufactured by Berg; rotational motor gear 142 is a 20 tooth stainless steel spur gear, manufactured by Berg. The gear ratio between main shaft gear 141 and rotational motor gear 142 is 2.5:1.

The longitudinal feed assembly is shown more fully in FIG. 13, wherein longitudinal feed motor 134, longitudinal feed motor gear 152, longitudinal feed screw 146, and longitudinal feed screw gear 154 are shown. Longitudinal feed screw 146 extends through threaded bushing 135 which is mounted in opening 137 in motor cradle 138. Also shown is stop plate 143 and bearings 145 (shown on one end only) that allow the longitudinal feed screw 146 to turn freely when the longitudinal feed motor 134 is actuated.

In a preferred embodiment, longitudinal feed motor 134 is a 1/100 hp motor manufactured by Globe Motors, Type No. 1M-15; longitudinal feed screw 146 is a ½" diameter stainless steel two-start acme thread lead screw, manufactured by Nook Industries; threaded bushing 135 is a bronze or plastic bushing also manufactured by Nook Industries with mating threads; longitudinal feed motor gear 152 is a 30 tooth stainless steel spur gear manufactured by Berg; longitudinal feed screw gear 154 is a 24 tooth stainless steel spur gear also manufactured by Berg. The gear ratio between longitudinal feed motor gear 152 and longitudinal feed screw gear 154 is 1.25:1.

Figure 11:
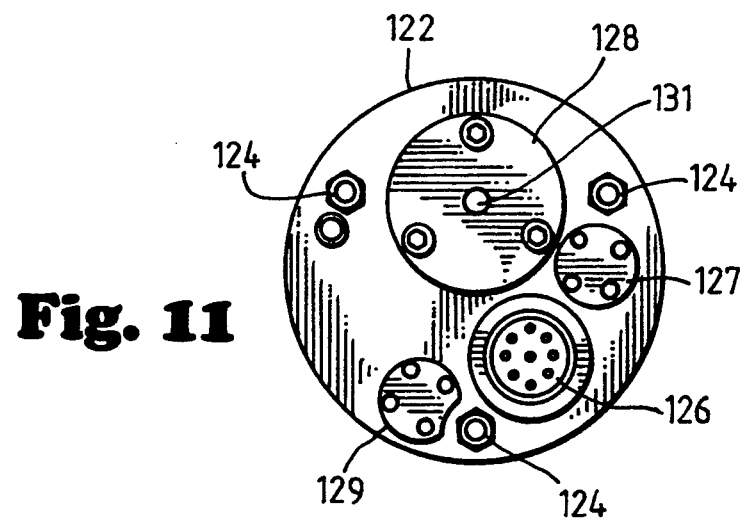
FIG. 11 is an elevation view of the rear cover plate of the robotic cutter.

FIG. 11 is an elevational view of back plate 122 which shows tie rods 124, electrical connection 126, rear support shaft 128, longitudinal feed screw retainer cap 127, and guide rod retainer cap 129. Retainer caps 127 and 129 allow insertion of longitudinal feed screw 146 and guide rod 132, respectively. Retainer cap 127 also holds the sleeve bearing associated with longitudinal feed screw 146. Threaded hole 131 is used to secure a bolt attached to chain 33 for restraint.

Figure 12:
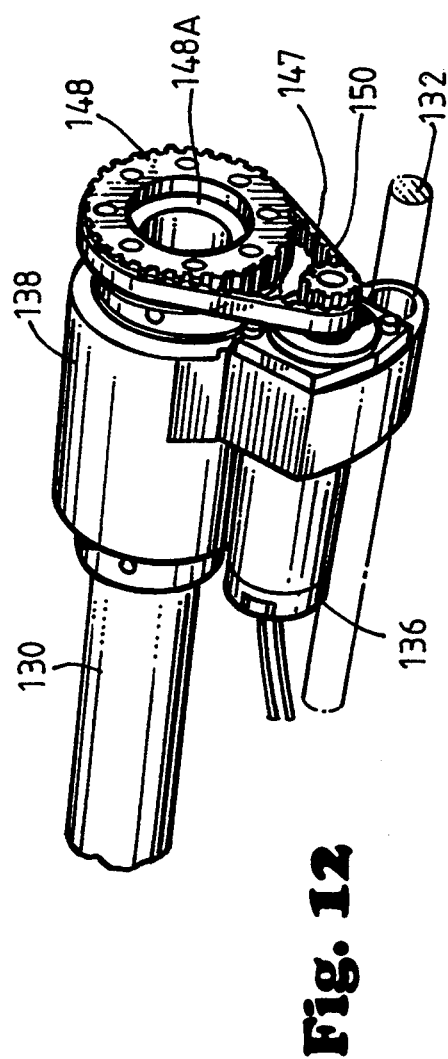
FIG. 12 is a perspective view of a motor cradle employing an alternative belt drive system in the robotic cutter.

As shown in FIGS. 12, 13, and 13B, rear support shaft 128 supports the rear portion of main shaft 130 when main shaft 130, and motor cradle 138, are moved in a forward direction. Rear support shaft 128 is in sliding engagement with linear bearing 148A. In a preferred embodiment, linear bearing 148A is a teflon coated bearing assembly manufactured by Pacific Bearings and sold under the trademark Simplicity. Hole 128B and bore 128A in rear support shaft 128 are used to provide access for electrical utilities to the motor 63 disposed in main shaft 130. In a preferred embodiment, rear support shaft 128 is made of highly polished hardened stainless steel and sized such that it adequately supports the rearmost end of main shaft 130 when main shaft 130 is in its forward most position. In a particularly preferred embodiment, rear support shaft 128 is approximately 8" in length.

Lastly, FIG. 12 shows an alternative embodiment for the rotational drive assembly of the present invention in which a belt drive is used as opposed to direct gear to gear drive as described above. More particularly, this alternative belt drive employs a drive gear 147, driven gear 148 and belt 150.

Operation of the Robotic Cutter

The operation of the robotic cutter 20 will now be described. Initially, robotic cutter 20, valving assembly 42, and a television camera (not shown) will be inserted into a previously lined sewer pipe. Upon positioning of the robotic cutter 20 in the approximate location of the entrance of the lateral, bladder 40 will be inflated to secure the robotic cutter 20 within the sewer pipe 26. Of course, as is readily apparent, the height of the cutter carriage 34 and valve assembly carriage 44 may be adjusted through use of varying lengths of extensions 35 and 45, thereby allowing the robotic cutter disclosed herein to be used in pipes of varying diameter.

The longitudinal movement of the cutter head assembly 38 is accomplished by longitudinal feed motor 134, longitudinal feed motor gear 152, longitudinal feed screw gear 154, longitudinal feed screw 146, threaded bushing 135, and motor cradle 138. As best understood by reference to FIG. 13, actuation of longitudinal feed motor 134 causes longitudinal feed motor gear 152 to rotate which is engaged with longitudinal feed screw gear 154, thus causing longitudinal feed screw 146 to rotate within threaded bushing 135. As the longitudinal feed screw 146 is rotated, threaded bushing 135 travels along longitudinal feed screw 146, thereby causing motor cradle 138 (fixed to main shaft 130) and main shaft 130 to be advanced in a longitudinal direction. In turn, this causes cutter head assembly 38, which is fixed to main shaft 130, to be advanced in a longitudinal direction.

The rotational movement of the cutter head assembly 38 about the longitudinal axis of the main shaft 130 can be best understood by reference to FIG. 10. Rotation of the cutter head assembly 38 is accomplished by rotational motor 136, rotational motor gear 142, main shaft gear 141, bearing assembly 140, and main shaft 130. In operation, when rotational motor 136 is actuated, rotational motor gear 142 will rotate in engagement with main shaft gear 141, which is in turn secured to main shaft 130, thereby imparting rotational movement to main shaft 130. Main shaft 130 is free to rotate within bearing assembly 140 that is secured within motor cradle 138.

The mechanism for providing vertical travel of the cutter head assembly 38 is best shown with reference to FIGS. 3-7A. In particular, vertical travel motor 63, is disposed within shaft 130 adjacent hub 60. In turn, vertical travel motor 63 is connected to pinion gear 98 which in turn is connected to driven gears 100, at least one of which is in contact with rack 96. Note that pinion gear 98 is not in contact with rack 96 and that driven gears 100 are mounted onto vertical travel block 48. Thus, when vertical travel motor 63 is actuated, pinion gear 98 rotates thereby imparting rotation to driven gears 100 which causes the rack 96 to move vertically within vertical travel block 48. Of course, this causes turntable 50, which is secured to rack 96, to travel vertically. The turntable 50 is free to travel vertically through use of linear bearings 102 which slide on bearing shafts 104.

The rotational movement of cutter motor 56 is best understood by reference to FIGS. 2-5A. In particular, pneumatic motor 62 causes gears 74 to rotate thereby causing rotation of worm gear shaft 76 and ultimately worm wheel gear 78. Worm wheel gear 78 is secured to base mounting block 157 with a plurality of screws 159 extending into bushing 78A in worm wheel gear 78, thereby insuring that upon rotation of worm wheel gear 78, base mounting block 157 and thus motor 56, will rotate about the axis X—X shown in FIG. 5A.

As shown in FIG. 1A, the control panel 22 has several control knobs and switches for controlling the various functions of the cutter 20 during operation. In particular, on/off switch 161 is used to control electrical power to the control panel 122 and cutter 20; indicator light 163 is illuminated when on/off switch 161 is in the "on" position; joystick 160 is used to control the longitudinal and rotational movement of cutter head assembly 38; vertical control switch 162 is used to fully raise or lower the turntable 50; stepped vertical control switch 164 allows control of the amount of vertical stepping of the cutting tool 58 during cutting operations, which may be adjusted from approximately 5–50 thousandths of an inch per step; speed control knob 166 allows for the regulation of the time period during which electrical motor 63 is energized during operations; current limit override switches 168, 169, and 170 are used whenever it is deemed necessary by the operator to temporarily increase power to motors 63, 134, and 136, respectively, for any reasons, e.g., to push the cutter head assembly through debris; pneumatic control on/off switches 171, 172, and 173 are used to control the flow of air to bladder 40, pneumatic motor 62, and cutter motor 56, respectively; and reverse switches 174A, 174B, and 174C may be used to reverse the polarity of the current flowing through each of electric motors 63, 134, and 136, independently so that, for example, when cutter head assembly 38 is operated in a downward or inverted position, the operator's sense of direction will remain unchanged as the cutting tool 58 is moved to various positions during cutting operations. In a preferred embodiment, the current limit switches are switches manufactured by National Semiconductors, Inc. with an external pass transistor to increase capacity to enable continuous stalled motor operation.

With the robotic cutter described herein, the liner may actually be cut with cutting tool 58 as opposed to the grinding action that resulted from use of many prior art cutters. Many prior art cutters employ relatively large dome or cone-shaped "cutting" tools that, in actuality, grind the liner away. This grinding action of the prior art cutters generates a great amount of dust, thereby reducing visibility of cutting operations in an underground sewer pipe and adversely impacting the ability of an operator to achieve an efficient and effective cut. However, the present cutter, with its high-speed motor, is able to rotate the cutting tool 58 at speeds of approximately 20,000 rpm. Thus, the cutting tool of the invention described herein actually cuts the liner material, as opposed to grinding the lining material, and produces flakes, as opposed to dust, during cutting operations. The flakes resulting from use of the present invention have a less detrimental effect on the visibility of cutting operations than does the dust produced by prior art cutters.

Additionally, the present robotic cutter increases the speed with which laterals may be re-opened. In particular, a robotic cutter with cutting motor 56 and cutting tool 58 disclosed herein, allows liner material to be cut at a faster rate than a robotic cutter using the large cone-shaped cutting tools commonly used on prior art cutters.

Another advantage of the present robotic cutter 20 is its relatively small size and weight which allows faster, safer, and easier handling of the device. In the preferred embodiment disclosed herein, the robotic cutter 20 (without valve assembly 42) is approximately 22" long and weighs approximately 25 pounds. The cylindrical housing for the cutter is approximately 4 ½" in diameter and ⅜" inches thick. The cutter disclosed herein may be used in pipe sizes as small as 6".

Another feature of the present invention is that the cutter motor 56, and thus cutting tool 58, may be positioned at different heights and at different radial distances from the axis X—X as shown in FIG. 5A. The position of the cutting tool 58 at a higher inclined position allows the cutting tool 58 to extend further into the lateral thereby allowing removal of resin debris that may extend up into the lateral during the lining process. The adjustment of the radial distance from the axis X—X allows the cutter to be set to cut lateral openings of different sizes. The adjustments to the height and radial position of the cutting tool may be accomplished by shifting brackets 52 laterally relative to the X—X axis, by securing motor mounting block 55 at different heights within brackets 52, and by varying the length of tool 58, etc.

The vertical drive assembly 94 is also a unique feature of this invention in that it maximizes the vertical stroke of the robotic cutter while minimizing the overall physical dimension of the vertical drive assembly. With the gear drive mechanism shown in FIG. 6, the stroke length is approximately 1 ⅛" from the centerline of main shaft 130 (3" total stroke). For the belt drive version shown in FIG. 8A, or for the gear drive version with an extended block and rack (not shown in the drawings) the total stroke length is approximately 5 inches. Thus, with the standard gear drive shown in FIG. 6, the robotic cutter may be used in 6–12" diameter pipe. With the belt drive version of the vertical drive assembly 94, as shown in FIG. 8A, the robotic cutter may be used on 12" and larger diameters pipes.

Another feature of the present invention is that each of the electrical motors previously described herein are current or torque limited by electronic circuits and can be stalled for an indefinite period of time during cutting operations. Through use of these circuits, the need for limit switches, and the accompanying circuitry, is eliminated.

For example, if an operator inadvertently or unwittingly tries to force the cutter head assembly 38 in a longitudinal direction when it is against a solid structure, the motor will stall at a certain current level and can maintain that level for as long as the operator tries to force the cutter head assembly 38 against the solid structure. Through use of these torque limiting electronic circuits, the cutter is made more durable and serviceable in that there is little likelihood that the motors will burn up during operations. However, the types of motors and circuits disclosed in the preferred embodiment should not be considered a limitation of the invention disclosed herein. Rather, the improved robotic cutter disclosed herein may employ any hydraulic, pneumatic, or electrical motor and still be within the scope of the invention.

I claim:
1. A cutter for use within a conduit, comprising:
a body;
a shaft extending from said body, said shaft having a longitudinal centerline;
a cutter motor disposed on one end of said shaft, said cutter motor having a cutting tool rotatably attached thereto;
means for causing movement of said cutting motor and tool in a direction generally parallel to the longitudinal centerline of said shaft;
means for causing movement of said cutting motor and tool in a direction generally transverse to the longitudinal center line of said shaft;

means for causing rotational movement of said cutting motor and tool about the longitudinal centerline of said shaft, or a line parallel thereto; and means for causing said cutting motor and tool to rotate about an axis generally perpendicular to the longitudinal axis of said shaft with said cutting tool displaced radially relative to said perpendicular axis.

2. A cutter as set forth in claim 1 wherein said means for causing said cutter tool to rotate about an axis generally perpendicular to the longitudinal axis of said shaft, comprises:

a worm wheel gear rotatable with the cutter motor about said perpendicular axis;

a worm gear shaft adapted for engagement with said worm wheel gear; and a first drive motor adapted to rotate said worm gear shaft and thereby rotate said worm wheel gear and said cutter motor.

3. A cutter as set forth in claim 1, wherein said means for causing movement of said cutting tool in a direction generally parallel to the longitudinal centerline of said shaft, comprises:

a second drive motor supported by said body;

a feed screw supported by said body, said feed screw drivingly coupled to said second drive motor;

a motor cradle assembly supported in said body, said motor cradle assembly fixed to said shaft; and a threaded bushing disposed in said motor cradle assembly, said threaded bushing adapted for engagement with said feed screw such that operation of said second drive motor causes movement of said feed screw relative to said bushing thereby causing movement of said shaft and said cutting tool.

4. A cutter as set forth in claim 1 wherein said means for causing movement of said cutting tool in a direction generally transverse to the longitudinal centerline of said shaft, comprises:

a third motor;

a turntable adapted to support said cutter motor disposed thereon; and means for drivingly coupling said turntable to said third drive motor.

5. A robotic cutter as set forth in claim 4 wherein said means for drivingly coupling said turntable to said third drive motor, comprises:

a pinion gear mounted to the shaft of said third drive motor;

a rack attached to the turntable and extending transversely relative to said shaft of said third drive motor; and gearingly interconnecting said pinion gear and said rack so as to move the rack in response to rotation of said pinion gear.

6. A cutter as set forth in claim 1 wherein said means were causing rotational movement of said cutting tool about the longitudinal centerline of said shaft, comprises:

a fourth drive motor supported by said body;

a motor cradle assembly supported by said body, said motor cradle assembly having a bearing assembly disposed therein, said shaft extending through said bearing assembly; and means for drivingly coupling said shaft to said fourth drive motor.

7. A cutter as recited in claim 6, wherein said means for drivingly coupling said shaft to said fourth drive motor, comprises:

a first gear coupled to said fourth drive motor; and a second gear fixed to said shaft, said second gear adapted for engagement with said first gear.

8. A cutter for use in a conduit, comprising:

a body;

a shaft extending from said body, said shaft having a longitudinal centerline;

a cutter motor disposed on one end of said shaft, said cutter motor having a cutting tool rotatably attached thereto;

means for causing movement of said cutting motor and tool in a direction generally parallel to the longitudinal centerline of said shaft;

means for causing rotational movement of said cutting motor and tool about the longitudinal centerline of said shaft, or a line parallel thereto; and a transverse drive assembly for causing movement of said cutting motor and tool in a direction generally transverse to the longitudinal centerline of said shaft, comprising:

a transverse drive motor, said transverse drive motor having a pinion gear attached thereto;

two driven gears, said driven gears adapted for engagement with said pinion gear;

a turntable having said cutter motor disposed thereon, said turntable having at least one bearing positioned therein, said bearing adapted for sliding engagement with a bearing shaft; and a rack secured to said turntable, said rack adapted for engagement with at least one of said driven gears.

9. A cutter for use in a conduit, comprising:

a body;

a shaft extending from said body, said shaft having a longitudinal centerline;

a cutter motor disposed on one end of said shaft, said cutter motor having a cutting tool rotatably attached thereto;

a longitudinal drive assembly for causing longitudinal movement of said cutting motor and tool in a direction generally parallel to the longitudinal centerline of said shaft, comprising:

a longitudinal drive motor having a first gear attached thereto;

a longitudinal feed screw having a second gear attached thereto, said second gear adapted for engagement with said first gear on said longitudinal drive motor;

a motor cradle assembly fixed to said shaft; and a threaded bushing disposed in said motor cradle assembly, said threaded bushing adapted for engagement with said longitudinal feed screw such that operation of said longitudinal drive motor cause movement of said longitudinal feed screw relative to said bushing thereby causing movement of said shaft and said cutting tool;

a transverse drive assembly for causing transverse movement of said cutting motor and tool in a direction generally transverse to the longitudinal centerline of said shaft, comprising:

a transverse drive motor having a pinion gear attached thereto;

at least one driven gear adapted for engagement with said pinion gear;

a platform having said cutter motor disposed thereon, said platform having at least one bearing positioned therein, said bearing adapted for sliding engagement with a bearing shaft; and a rack secured to said platform, said rack adapted for engagement with at least one of said driven gears;

a rotational drive assembly for causing rotation of said cutting motor and tool about the longitudinal axis of said shaft, or a line parallel thereto, comprising:

a rotational motor having a first rotational gear attached thereto;

a second rotational gear affixed to said shaft, said second rotational gear adapted for engagement with said first rotational gear; and a motor cradle assembly having a bearing assembly disposed therein, said shaft extending through said bearing assembly;

a cutting tool rotation drive assembly for causing rotation of said cutting tool about an axis generally perpendicular to the longitudinal axis of said shaft, comprising of:

a worm wheel gear;

a worm gear shaft adapted for engagement with said worm wheel gear;

a motor drivingly coupled to a shaft, said shaft being further drivingly coupled to said worm gear shaft; and means for securing said cutter motor to said worm wheel gear, said cutter motor having said cutting tool disposed therein.

10. A method of opening a closed lateral conduit from within a previously lined main conduit, said lateral conduit having a longitudinal axis, comprising the steps of:

positioning a cutting apparatus within said main conduit adjacent said closed lateral conduit, said cutting apparatus having a cutting motor disposed therein with a cutting tool disposed therein, said cutting motor and tool being rotatable in a generally circular path about the longitudinal axis of said lateral conduit;

positioning said cutting tool adjacent said closed lateral conduit such that said cutting motor and tool rotates generally about the longitudinal axis of said lateral conduit;

actuating said cutting motor so as to cause rotation of said cutting tool; and advancing said cutting motor and tool in a direction generally parallel to the longitudinal axis of said lateral conduit while rotating said cutting motor and tool in said generally circular path, thereby opening said lateral connection.

* * * * *